(12) United States Patent
Wang et al.

(10) Patent No.: US 11,900,160 B2
(45) Date of Patent: Feb. 13, 2024

(54) METHODS FOR MANAGING STORAGE QUOTA ASSIGNMENT IN A DISTRIBUTED SYSTEM AND DEVICES THEREOF

(71) Applicant: NetApp, Inc., San Jose, CA (US)

(72) Inventors: Xin Wang, Sewickley, PA (US); Keith Allen Bare, II, Pittsburgh, PA (US); Ying-Hao Wang, Pittsburgh, PA (US); Jonathan Westley Moody, Pittsburgh, PA (US); Bradley Raymond Lisson, Langley (CA); Richard Wight, Vancouver (CA); David Loren Rose, Vancouver (CA); Richard P. Jernigan, IV, Sewickley, PA (US); Daniel Tennant, New Wilmington, PA (US)

(73) Assignee: NETAPP, INC., San Jose, CA (US)

( * ) Notice: Subject to any disclaimer, the term of this patent is extended or adjusted under 35 U.S.C. 154(b) by 91 days.

(21) Appl. No.: 17/744,056

(22) Filed: May 13, 2022

(65) Prior Publication Data

US 2022/0269541 A1 Aug. 25, 2022

Related U.S. Application Data

(63) Continuation of application No. 16/577,916, filed on Sep. 20, 2019, now Pat. No. 11,354,160.

(Continued)

(51) Int. Cl.
*G06F 9/50* (2006.01)
*G06F 13/28* (2006.01)

(52) U.S. Cl.
CPC .......... *G06F 9/5011* (2013.01); *G06F 9/5077* (2013.01); *G06F 13/282* (2013.01); *G06F 2209/504* (2013.01)

(58) Field of Classification Search
CPC .... G06F 9/5011; G06F 9/5077; G06F 13/282; G06F 2209/504; G06F 9/5061
See application file for complete search history.

(56) References Cited

U.S. PATENT DOCUMENTS 6,185,221 B1 2/2001 Aybay
7,017,016 B2 3/2006 Chujo et al.
(Continued)

OTHER PUBLICATIONS

IBM, "IBM Smartcloud Virtual Storage Center Storage Analytics Engine"; Quick Start Guide, 2014, 2 pages, version 5.2.4, IBM.
IBM, "IBM Tivoli Storage Productivity Center; Administrator's Guide", 2014, 306 pages, version 5.2.4, IBM.
IBM, "IBM Tivoli Storage Productivity Center for Replication for System z; Installation and Configuration Guide", 2014, 62 pages, version 5.2.4, IBM.
(Continued)

*Primary Examiner* — Jorge A Chu Joy-Davila
(74) *Attorney, Agent, or Firm* — Troutman Pepper Hamilton Sanders LLP (Rochester)

(57) ABSTRACT

Methods, non-transitory machine readable media, and computing devices that more efficiently and effectively manage storage quota enforcement are disclosed. With this technology, a quota ticket comprising a tally generation number (TGN) and a local allowed usage amount (AUA) are obtained. The local AUA comprises a portion of a global AUA associated with a quota rule. The local AUA is increased following receipt of another portion of the global AUA in a response from a cluster peer, when another TGN in the response matches the TGN and the local AUA is insufficient to execute a received storage operation associated with the quota rule. The local AUA is decreased by an amount corresponding to, and following execution of, the storage operation, when the increased local AUA is sufficient to execute the storage operation.

20 Claims, 10 Drawing Sheets

Related U.S. Application Data

(60) Provisional application No. 62/779,067, filed on Dec. 13, 2018.

(56) References Cited

U.S. PATENT DOCUMENTS

| | | |
|---|---|---|
| 7,716,275 B1 | 5/2010 | Nagaralu et al. |
| 8,255,915 B1 | 8/2012 | Blanding et al. |
| 8,832,687 B2 | 9/2014 | Baron |
| 8,856,484 B2 | 10/2014 | Ben-Tsion et al. |
| 9,201,896 B2 | 12/2015 | Darcy et al. |
| 9,823,978 B2 | 11/2017 | Mutha et al. |
| 10,063,601 B2 | 8/2018 | Yu et al. |
| 11,354,160 B2 | 6/2022 | Wang et al. |
| 2009/0288084 A1 | 11/2009 | Astete et al. |
| 2010/0064043 A1 | 3/2010 | Iino et al. |
| 2011/0307570 A1 | 12/2011 | Speks |
| 2017/0132286 A1 | 5/2017 | Baranczyk et al. |
| 2018/0018344 A1 | 1/2018 | Kilaru et al. |

OTHER PUBLICATIONS

IBM, "IBM Tivoli Storage Productivity Center for Replication for System z; User's Guide", 2014, 246 pages, version 5.2.4. IBM.

IBM, "IBM Tivoli Storage Productivity Center; installation Guide", 2014, 370 pages, version 5.2.4, IBM.

IBM, "IBM Tivoli Storage Productivity Center; Quick installation Guide", 2014, 40 pages, version 5.2.4, IBM.

IBM, "IBM Tivoli Storage Productivity Center; Quick Start Guide", 2014, 2 pages, version 5.2.4, IBM.

IBM, "IBM Tivoli Storage Productivity Center Select Edition; Quick Start Guide", 2014, 2 pages, version 5.2.4, IBM.

IBM, "IBM Tivoli Storage Productivity Center; User's Guide", 2014, 1194 pages, version 5.2.4, IBM.

IBM, "Program Director for Tivoli Storage Productivity Center for Replication Basic Edition for System z", Oct. 2013, 30 pages, version 5.2.0, IBM.

IBM, "Program Director for Tivoli Storage Productivity Center for Replication for System z", Oct. 2013, 28 pages, version 5.2.0, IBM.

METHODS FOR MANAGING STORAGE QUOTA ASSIGNMENT IN A DISTRIBUTED SYSTEM AND DEVICES THEREOF

This application is a continuation of U.S. patent application Ser. No. 16/577,916, filed Sep. 20, 2019, which claims the benefit of U.S. Provisional Patent Application Ser. No. 62/779,067, filed on Dec. 13, 2018, each of which is hereby incorporated by reference in its entirety.

FIELD

This technology generally relates to data storage networks and, more particularly, to methods and devices for managing storage quota assignment in a distributed system.

BACKGROUND

Data storage networks are becoming increasingly complex and scalable to handle the data storage requirements of enterprise users. In some storage arrangements, data is stored in a distributed fashion across multiple volume members, which collectively comprise a group and are distributed across multiple storage nodes. The file systems associated with the data maintained in the group of member volumes can have quota limits for space, for example, which can be enforced by rule(s) associated with a user, group, and/or quota tree (also referred to as a Qtree). For example, a user may have a quota limit on total space usage for files and/or directories located in any number of volumes that are members of a group.

For quota enforcement, the volume members of a group need to coordinate a shared set of quota records and change their quota consumption as a collective unit. Enforcement of quotas in a volume group is challenging due in part to distributed, parallel consumption of the group members. Performing and managing distributed quota enforcement often results in a negative performance impact to file operations, which is undesirable. Additionally, when quota usage is approaching a limit, more precise enforcement, and associated communication overhead between storage nodes, is required that further decreases file operation performance.

DETAILED DESCRIPTION

Figure 1:
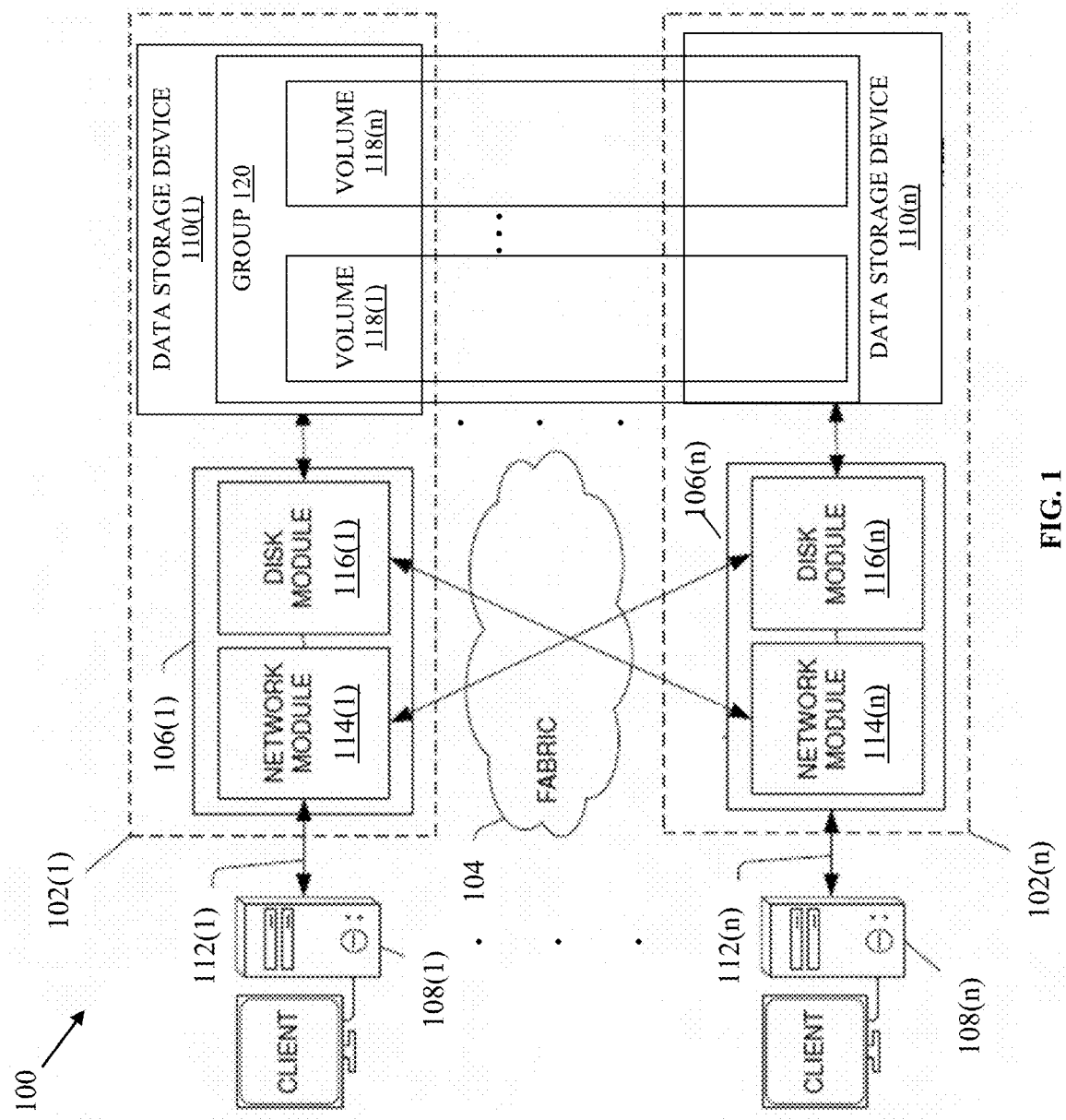
FIG. 1 is a block diagram of a network environment with exemplary node computing devices.

A clustered network environment 100 that may implement one or more aspects of the technology described and illustrated herein is shown in FIG. 1. The clustered network environment 100 includes data storage apparatuses 102(1)-102(n) that are coupled over a cluster or data fabric 104 that includes one or more communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that more effectively and efficiently manage quota assignment and enforcement with reduced resource utilization and impact on file operations.

In this example, node computing devices 106(1)-106(n) can be primary or local storage controllers or secondary or remote storage controllers that provide client devices 108(1)-108(n) with access to data stored within data storage devices 110(1)-110(n). The data storage apparatuses 102(1)-102(n) and/or node computing devices 106(1)-106(n) of the examples described and illustrated herein are not limited to any particular geographic areas and can be clustered locally and/or remotely via a cloud network, or not clustered in other examples. Thus, in one example the data storage apparatuses 102(1)-102(n) and/or node computing devices 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within cloud storage device(s)), etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks (i.e., cloud networks) embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In this example, the volumes 118(1)-118(n) span data storage devices 110(1)-110(n) and data storage apparatuses 102(1)-102(n), and collectively comprise a group 120, although other arrangements can also be used. In one example, volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form cluster or groups (e.g., group 120), among other functionality. Optionally, one or more of the volumes 118(1)-118(n) can be in composite aggregates and can extend between one or more of the data storage devices 110(1)-110(n) and one or more cloud storage device(s) (not shown) to provide tiered storage, for example, and other arrangements can also be used in other examples.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
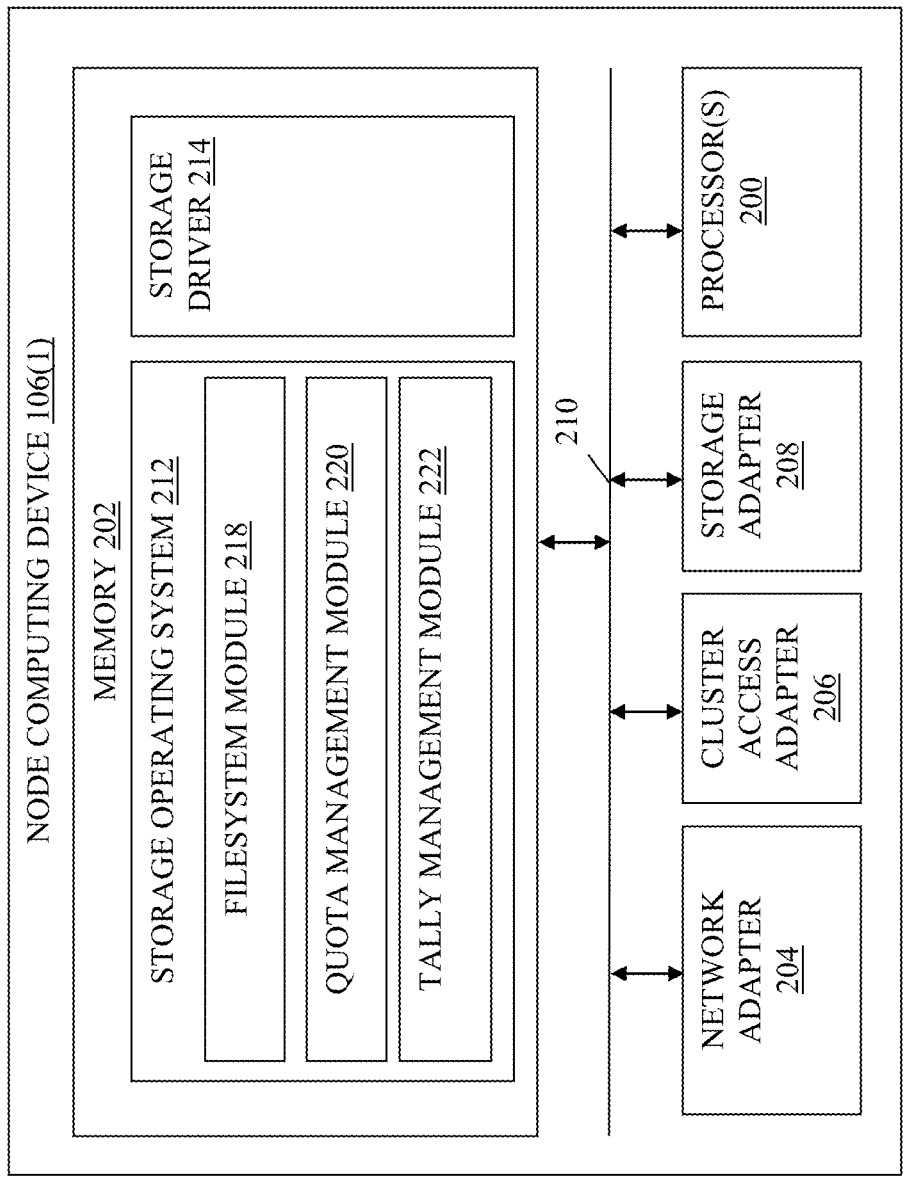
FIG. 2 is a block diagram of one of the exemplary node computing devices of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) (not shown) with cloud storage device(s) 136 to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) or cloud storage device(s) 136 (e.g., or additional clustered devices) in accordance with the client device requests.

The file system module 218 of the storage operating system 212 can establish and manage one or more filesystems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes a quota management module 220 and a tally management module 222. The quota management module 220 manages local allowed usage amount (AUA), which is a quantity representing the amount of quota left to be consumed against a specific quota rule. A global AUA is distributed among the node computing devices 106(1)-106(n) and represents the quota for a particular rule (e.g., a particular user is allowed a particular amount of storage space for the group 120 of volumes 118(1)-118(n)). Accordingly, the quote management module manages the local AUA as storage operations are processed by the node computing device 106(n). The operation of the quota management module 220 is described and illustrated in more detail later with reference to FIGS. 3 and 6-10, for example.

The tally management module 222 in this example communicates with the quota management module 220 of each of the node computing device 106(1)-106(n) to obtain local AUA quantities and determines the global AUA from the obtained local AUA quantities as part of a tally operation. In this example, the node computing device 106(1) is designated as a canonical source of global AUA quantities and is tasked with running cross-cluster tally operations, but any other node computing device in the cluster could also be denoted the tally manager and include an active tally management module 222. Based on the tally operation, the tally management module 222 is further configured to generate and issue tickets to other node computing devices in the cluster that include quota information including the portion of the quota available and allocated to the other node computing devices. The operation of the tally management module 222 is described and illustrated in more detail later with reference to FIGS. 3-5, for example.

The examples of the technology described and illustrated herein may be embodied as one or more non-transitory computer or machine readable media, such as the memory 202, having machine or processor-executable instructions stored thereon for one or more aspects of the present technology, which when executed by processor(s), such as processor(s) 200, cause the processor(s) to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-10, for example.

Figure 3:
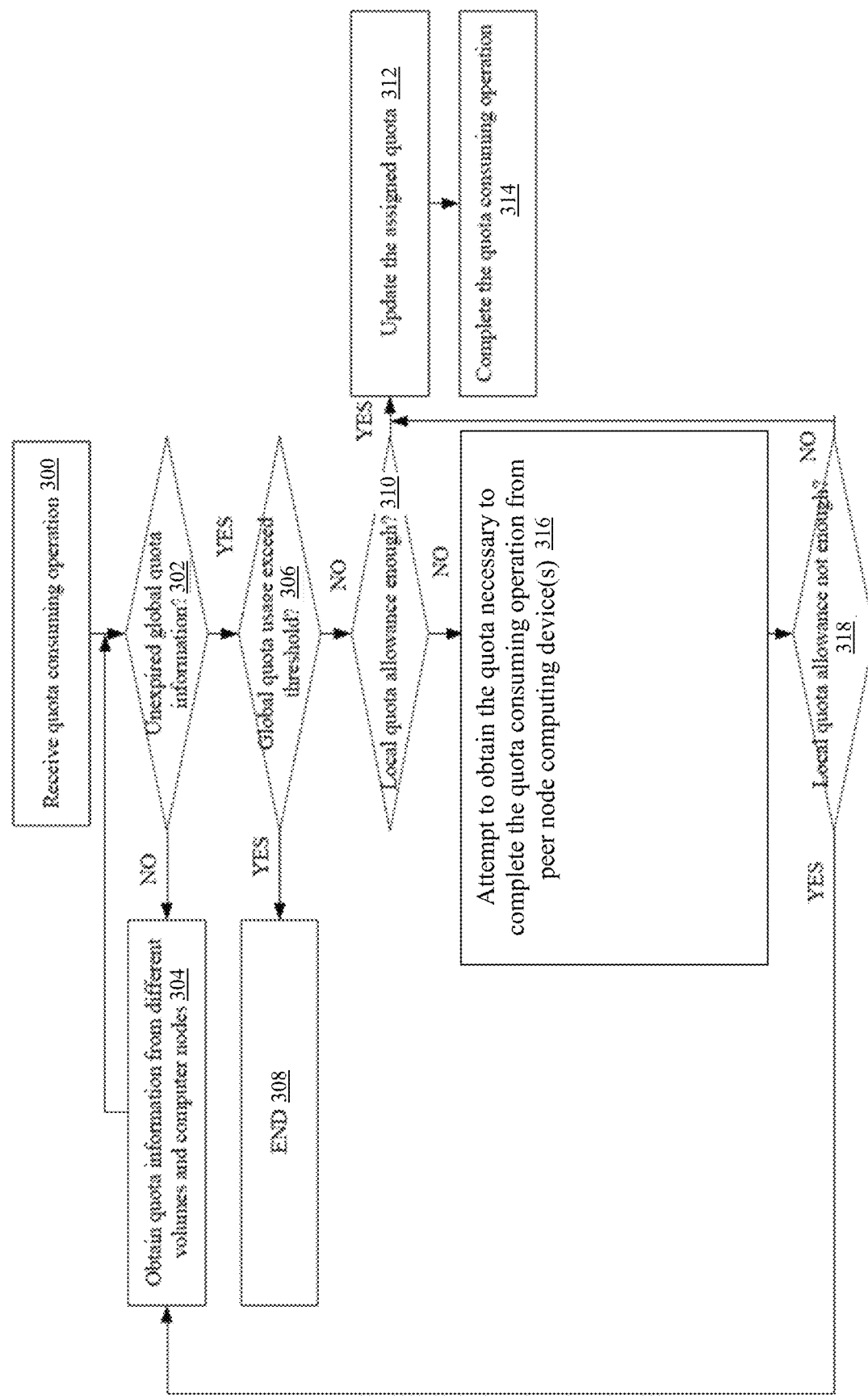
FIG. 3 is a flowchart of an exemplary method for managing storage quota assignment in a distributed system.

Referring more specifically to FIG. 3, a flowchart illustrating an exemplary method for managing storage quota assignment in a distributed system is illustrated. In step 300 in this example, the node computing device 106(1) receives a quota consuming operation. The quote consuming operation can be a write storage operation directed to the volume 118(1) and received from one of the client devices 108(1)-108(n), for example, although other types of quota consuming operations can also be received. The quota consuming operation can be associated with a particular user, for example, or otherwise have characteristics applicable for a quota rule. In one example, the quota rule can restrict the amount of utilized storage space within the volumes 118(1)-118(n) of the group 120 for a particular user of one of the client devices 108(1)-108(n), although other types of quota rules can also be used.

In step 302, the node computing device 106(1) determines whether global quota information maintained locally is unexpired. The global quota information can be maintained in a ticket received from one of the node computing device 106(1)-106(n) designated to be a tally manager for the cluster, which is the node computing device 106(1) in this particular example. The tickets can have an associated time-to-live (TTL), which is used to determine expiration. Accordingly, if the node computing device 106(1) determines that the global quota information is not unexpired, then the No branch is taken to step 304.

In step 304, the node computing device 106(1) obtains quota information for the various volumes 118(1)-118(n) in the group 120 associated with the received quota consuming operation, which may be hosted be other node computing devices in the cluster (e.g., node computing devices 106(2)-106(n)). Accordingly, the node computing device 106(1) can request quota information from the tally manager in the cluster, or the local tally management module 222 in this example, and receive a ticket with global quota information in response.

Figure 4:
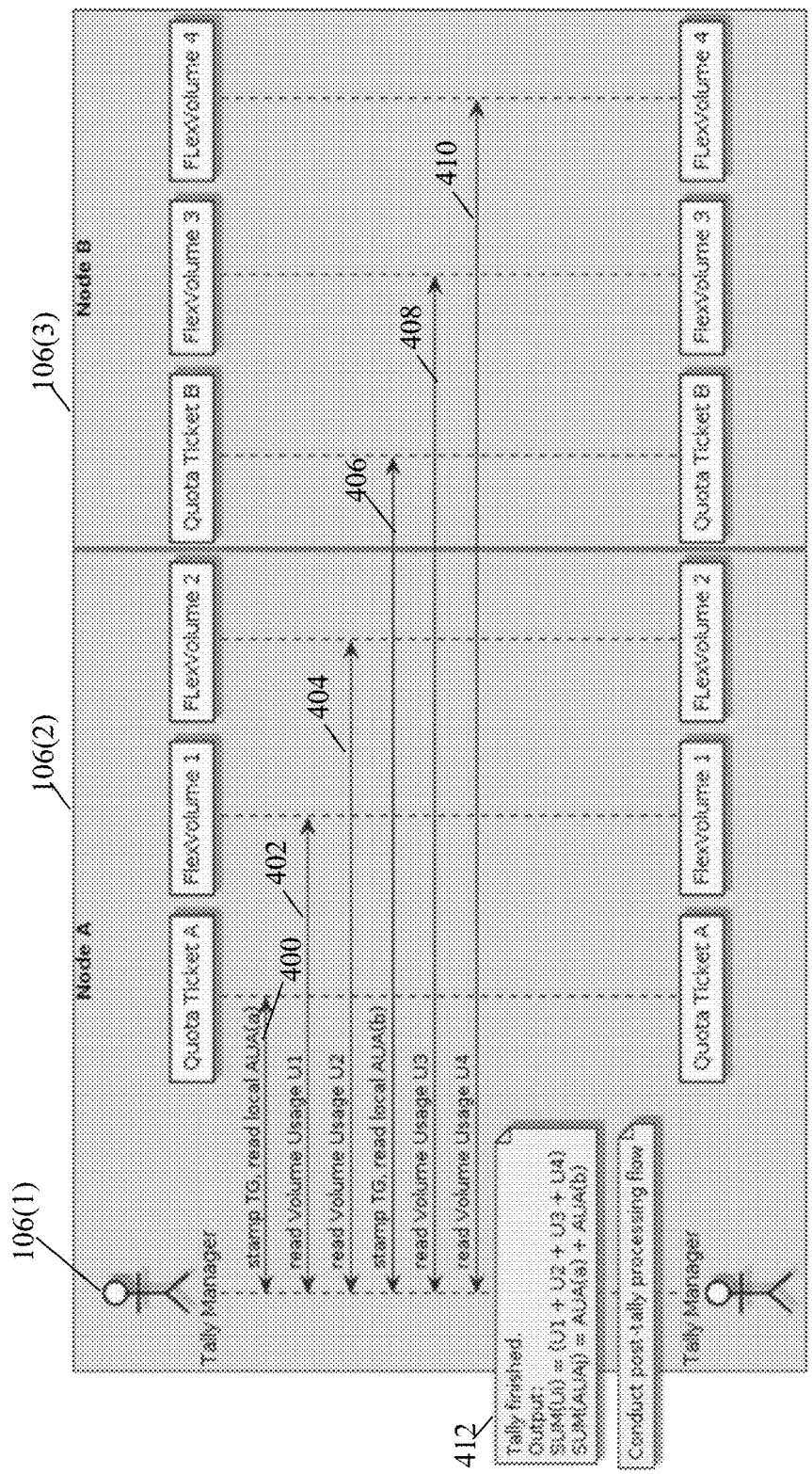
FIG. 4 is a flow diagram of an exemplary method for conducting a tally with the exemplary node computing device of FIG. 2.

Referring more specifically to FIG. 4, a flow diagram of an exemplary method for conducting a tally is illustrated. In this example, the tally is conducted by the tally management module 222 in response to a request from the quota management module 220, although the request can be from another quota management module 220(2)-220(n) on another node computing device 106(2)-106(n) in the cluster. The tally is persisted to all nodes in the cluster in parallel.

In step 400, the tally management module 222 of the node computing device 106(1) generates a quota ticket A for node 106(2) and stamps the quota ticket A with a ticket generation number (TGN) (referred to as TG in FIG. 4). The TGN uniquely identifies the particular tally and is stamped for every node as part of the tally operation. Optionally, the TGN is a monotonically increasing number maintained by the tally management module 222, although other TGNs can also be used. Additionally, the node computing device 106(1) obtains a local AUA from the node computing device 106(2), which can be maintained by the quota management module 220(2) of the node computing device 106(2), for example.

As explained earlier, the AUA is a quantity representing the amount of quota left to be consumed against a particular quota rule. Each of the node computing devices 106(1)-106(n) has a portion of the global AUA, which is referred to as a local AUA, such that the sum of the local AUAs from all of the node computing devices 106(1) is equivalent to the global AUA for the group 120.

In steps 402 and 404, the tally management module 222 of the node computing device 106(1) reads the volume usage for FlexVolume 1 and FlexVolume 2, which are in the same group 120, and obtains usage 1 (U1) and usage 2 (U2), respectively. The usages in this example are actual quota usage, for the FlexVolume 1 and FlexVolume 2 group members, against the specific quota rule associated with the local AUA, which is maintained locally by a quota management module 220(2) of the node computing device 106(2).

In step 406, the tally management module 222 of the node computing device 106(1) generates a quota ticket B for node computing device 106(3) and stamps the quota ticket B with the same ticket generation number generated and used in step 400. The node computing device 106(1) also obtains the local AUA from node computing device 106(3).

In steps 408 and 410, the tally management module 222 of the node computing device 106(1) reads the volume usage for FlexVolume 3 and FlexVolume 4, which are in the same group 120 as FlexVolume 1 and FlexVolume 2, and obtains usage 3 (U3) and usage 4 (U4), respectively. The usages in this example are actual quota usage, for the FlexVolume 3 and FlexVolume 4 group members, against the specific quota rule associated with the local AUA obtained in step 406, which is maintained locally by a quota management module 220(3) of the node computing device 106(3).

In step 412, the tally management module 222 of the node computing device 106(1) finishes the tally operation and generates the sum of the usages (referred to in FIG. 4 as SUM(Ui)) and the sum of the AUAs (referred to in FIG. 4 as SUM(AUAj)) from all of the node computing devices 106(2) and 106(3). The node computing device 106(1) subsequently proceeds to conduct post-tally processing.

Figure 5:
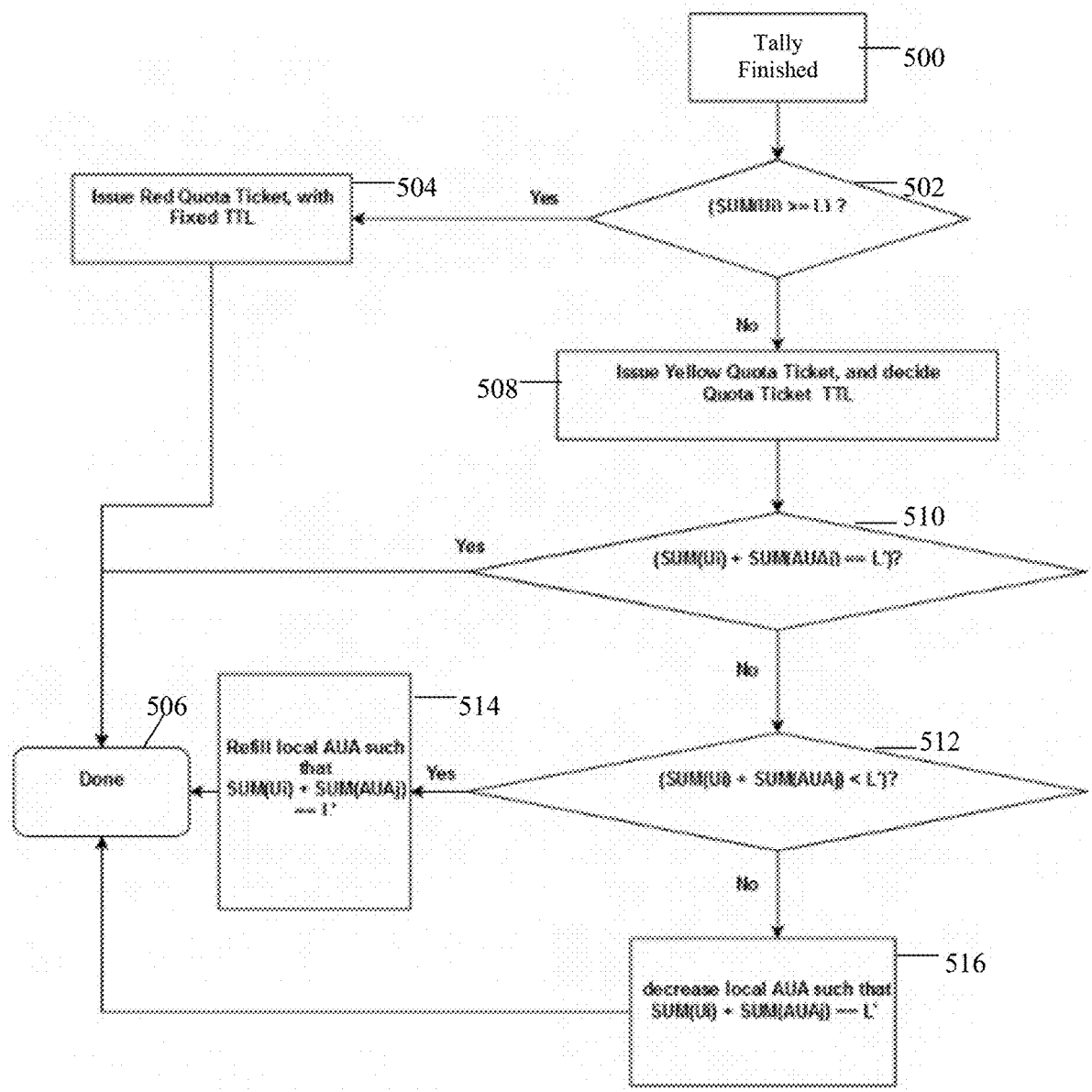
FIG. 5 is a flowchart of an exemplary method for post-tally processing by the exemplary node computing device of FIG. 2.

Referring more specifically to FIG. 5, a flowchart of an exemplary method for post-tally processing is illustrated. In step 500 in this example, the tally management module 222 of the node computing device 106(1) finishes conducting the tally described and illustrated earlier with reference to FIG. 4.

In step 502, the tally management module 222 of the node computing device 106(1) determines whether the SUM(Ui) is greater than or equal to an administrated externally visible quota limit (referred to in FIG. 5 as L). If the node computing device 106(1) determines that the SUM(Ui) is greater than or equal to L, then the Yes branch is taken to step 504.

In step 504, the tally management module 222 of the node computing device 106(1) issues red quota ticket(s) with a fixed TTL. The color of the quota ticket refers to whether the traffic or quota consuming operations must stop (red quota ticket in this example) or whether quota consuming operations can continue (yellow quota ticket in this example). The color of the quota ticket can be indicated as a flag or other data that is attached to the quota ticket, and other types of colors or indications can also be used.

The red quota ticket(s) that are issued can be the quota tickets generated and stamped as described and illustrated earlier with reference to steps 400 and 406 of FIG. 4, for example. Subsequent to issuing the quota ticket (e.g., to the node computing devices 106(2) and 106(3)), the node computing device 106(1) proceeds to step 506 and the method ends. However, if the node computing device 106(1) determines that the SUM(Ui) is not greater than or equal to L in step 502, then the No branch is taken to step 508.

In step 508, the tally management module 222 of the node computing device 106(1) issues yellow quota ticket(s) and determines a particular TTL for the yellow quota ticket(s). The yellow quota ticket(s) that are issued can be the quota tickets generated and stamped as described and illustrated earlier with reference to steps 400 and 406 of FIG. 4, for example. Accordingly, the yellow quota ticket(s) can be issued to the node computing devices 106(2) and 106(3) in this example.

Advantageously, the TTL of the yellow quota ticket(s) is determined based on the comparison performed in step 502 such that the TTL decreases as the gap between L and SUM(Ui) decreases. Accordingly, tallies are conducted more frequently as total quota usage for the group 120 (i.e., SUM(Ui)) approaches the limit (i.e., L). Subsequent to issuing the yellow quota ticket(s), the node computing device 106(1) proceeds to step 510.

In step 510, the tally management module 222 of the node computing device 106(1) determines whether the sum of the sum of the usages (SUM(Ui)) and the sum of the AUAs (SUM(AUAj)) is equivalent to an internal limit used to determine the global AUA, which is referred to in FIG. 5 as L'. In this example, L' is established to be larger than L, but the difference between L' and L is bounded. Accordingly, the sum of SUM(Ui) and SUM(AUAj) is allowed to exceed the quota limit L by a bounded amount. if the node computing device 106(1) determines that the sum of SUM(Ui) and SUM(AUAj) is equivalent to L', then the Yes branch is taken to step 506 and the method ends. However, if the node computing device 106(1) determines that the sum of SUM (Ui) and SUM(AUAj) is not equivalent to L', then the No branch is taken to step 512.

In step 512, the tally management module 222 of the node computing device 106(1) determines whether the sum of SUM(Ui) and SUM(AUAj) is less than L'. If the node computing device 106(1) determines that the sum of SUM (Ui) and SUM(AUAj) is less than L', then the Yes branch is taken to step 514.

In step 514, the tally management module 222 of the node computing device 106(1) refills the local AUA for the node computing device 106 such that the sum of SUM(Ui) and SUM(AUAj) is equivalent to L'. If the sum of SUM(Ui) and SUM(AUAj) is not equal to, but is less than L', then there is quota available to be distributed, optionally in equivalent proportions, to each of the node computing devices 106(1)-106(3) in the cluster.

Refill of the local AUA can occur after the first tally is conducted for any particular quota rule, after one of the node computing device 106(1)-106(3) reboots and loses the local AUA previously stored in-memory, or when races between a tally and a steal operation occur, for example. Steal operations are described and illustrated in more detail later with reference to step 316 of FIG. 3 and FIGS. 6-10. Subsequent to refilling the local AUA, the node computing device 106(1) proceeds to step 506 and the method ends. However, if the node computing device 106(1) determines in step 512 that the sum of SUM(Ui) and SUM(AUAj) is not less than L', then the No branch is taken to step 516.

In step 516, the tally management module 222 of the node computing device 106(1) decreases the local AUA for the node computing device 106(1) such that the sum of SUM (Ui) and SUM(AUAj) is equivalent to L'. Decreasing the local AUA is generally a less common operation than the refilling of the local AUA in step 514. If the sum of SUM(Ui) and SUM(AUAj) is not equal to or less than L' (i.e., the sum of SUM(Ui) and SUM(AUAj) is greater than L'), then the quota is over-utilized and is decreased, optionally in equivalent proportions, to each of the node computing devices 106(1)-106(3) in the cluster. In relatively rare iterations, the local AUA may be negative after the decrease in step 516, which would trigger an additional steal process, which is described and illustrated in more detail later, in order to discard excessive AUA. Subsequent to decreasing the local AUA, the node computing device 106(1) proceeds to step 506 and the method ends.

Referring back to FIG. 3, subsequent to obtaining quota information via a quota ticket in step 304, the node computing device 106(1) proceeds back to step 302 and again determines whether the global quota information is unexpired (e.g., based on a TTL in the received quota ticket). Since the node computing device 106(1) recently received the quota ticket, the global quota information will not be expired in this iteration, and the Yes branch is therefore taken from step 302 to step 306.

In step 306, the node computing device 106(1) determines whether the global quota usage exceeds a threshold. The determination in step 306 can be based on a comparison with information in the quota ticket or the color of the quota ticket. In the example described and illustrated earlier, if the quota ticket is red, then the global quota usage has exceeded a particular threshold (e.g., the quota limit for the associated quota rule), and file operations are halted. Accordingly, if the node computing device 106(1) determines that the global quota usage exceeds a threshold, then the Yes branch is taken to step 308.

In step 308, the method ends and the node computing device 106(1) optionally returns a failure message in response to the quota consuming operations. Also optionally, the node computing device 106(1) can generate an alert to an administrator device (not shown) indicating that the global quota usage has exceeded a threshold or limit, which may prompt a manual quota adjustment or modification of the associated quota rule, for example. Other types of alerts and responses can also be generated in step 308. However, if the node computing device 106(1) determines in step 306 that the global quota usage has not exceeded a threshold, then the No branch is taken to step 310.

In step 310, the node computing device 106(1) determines whether a local quota allowance is sufficient to process the quota consuming operation. In one example, the quota consuming operation is a write operation and the node computing device 106(1) determines whether the local quota allowance (i.e., the local AUA identified in the quota ticket received in step 304) for the quota rule, which limits a user that originated the write operation to a particular storage size, exceeds the size of the data associated with the write operation. If the node computing device 106(1) determines that the local quota allowance is sufficient to process the quota consuming operation, then the Yes branch is taken to step 312.

In step 312, the node computing device 106(1) updates the assigned local quota allowance (i.e., the local AUA), and optionally a local actual quota usage amount, to reflect the result of the quota consuming operation. In the example described earlier, the node computing device 106(1) can reduce the local AUA by a quantity equivalent to the size of the data associated with the write operation, for example.

In step 314, the node computing device 106(1) completes the quota consuming operation. Accordingly, in the example described earlier, the node computing device 106(1) can execute the write operation with respect to one of the data storage devices 110(1)-110(n). Other types of quota consuming operations and quota rules can also be used in other examples. Subsequent to completing the quota consuming operation, the node computing device 106(1) proceeds back to step 300 in this example and waits to receive another quota consuming operation. However, if the node computing device 106(1) determines in step 310 that the local quota allowance is insufficient to process the quota consuming operation, then the No branch is taken to step 316.

In step 316, the node computing device 106(1) attempts to obtain the quota necessary to complete the quota consuming operation from one or more peer node computing devices in the cluster (e.g., node computing device 106(2) and/or 106(3)) in an operation referred to herein as a steal operation. Performing steal operations, and managing associated race conditions, will now be described with reference to FIGS. 6-10.

Figure 6:
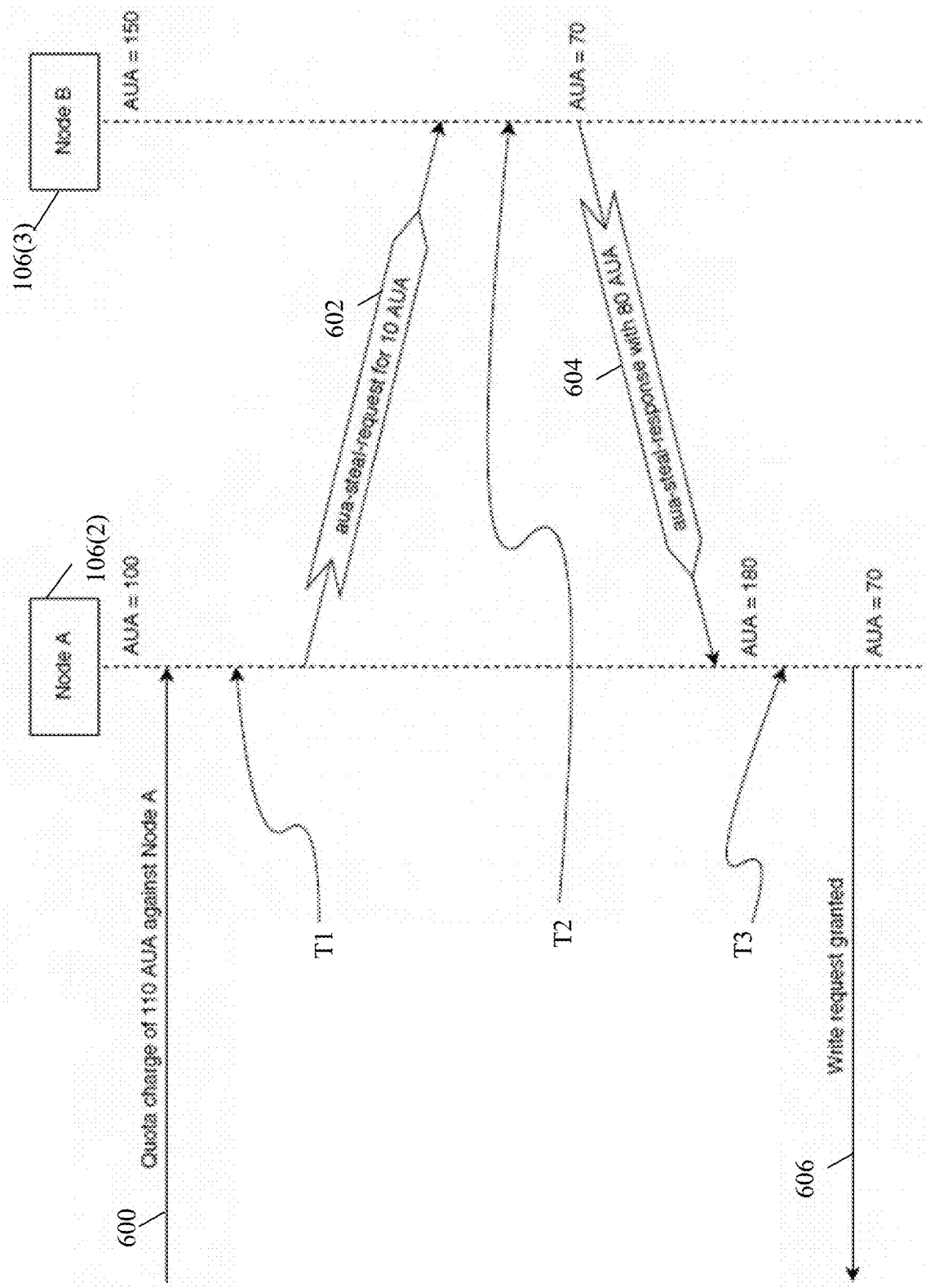
FIG. 6 is a timing diagram of an exemplary method for obtaining quota from a peer without a race condition.

Referring more specifically to FIG. 6, a timing diagram of an exemplary method for obtaining quota from a peer without a race condition is illustrated. In step 600 in this example, the node computing device 106(2) determines that it needs an additional 10 AUA to service a received quota consuming operation that requires 110 AUA, although any other of the node computing devices 106(1) and/or 106(3) could also initiate steal operations in other examples. Accordingly, at time T1, the node computing device 106(2) has determined that the global AUA is sufficient to execute the quota consuming operation, but its local AUA of 100 is insufficient to execute the quota consuming operation.

In step 602, the node computing device 106(2) sends a steal request to node computing device 106(3) to attempt to obtain the additional 10 AUA that it needs from the node computing device 106(3). The node computing device 106(3) can be selected at random within the cluster, although other methods of selecting a peer can also be used. At time T2, the node computing device 106(3) has determined that it has sufficient AUA to honor the steal request from the node computing device 106(2) since its local AUA is 150.

Accordingly, in step 604, the node computing device 106(3) sends AUA from its local AUA to the node computing device 106(2) in response to the steal request. In this example, the node computing device 106(3) sends the 10 AUA requested as well as half of its remaining AUA (i.e., 70 AUA) for a total of 80 AUA.

Since the node computing device 106(2) is likely to need additional AUA in the near future, proactively sending additional AUA improves performance and reduces the overheads required to conduct another steal operation to service a subsequent quota consuming operation. While the node computing device 106(2) sends half of its remaining AUA in this example, other amounts, including no additional AUA, can also be used in other examples. Subsequent to sending the AUA in response to the steal request, the node computing device 106(3) updates its local AUA to reflect the result of the steal operation.

At time T3, the node computing device 106(2) determines that it now has enough AUA to honor the charge initiated in step 600 and, accordingly, in step 606, the node computing device 106(2) grants the write request, which is the quota consuming operation in this example. Additionally, the node computing device 106(2) increases its local AUA by the AUA received from the node computing device 106(3) and reduces its local AUA by the charge associated with the write operation. In examples in which the node computing device 106(3) provided no or insufficient AUA, steps 602 and 604 are repeated with a different peer, optionally selected at random (e.g., node computing device 106(1)).

Figure 7:
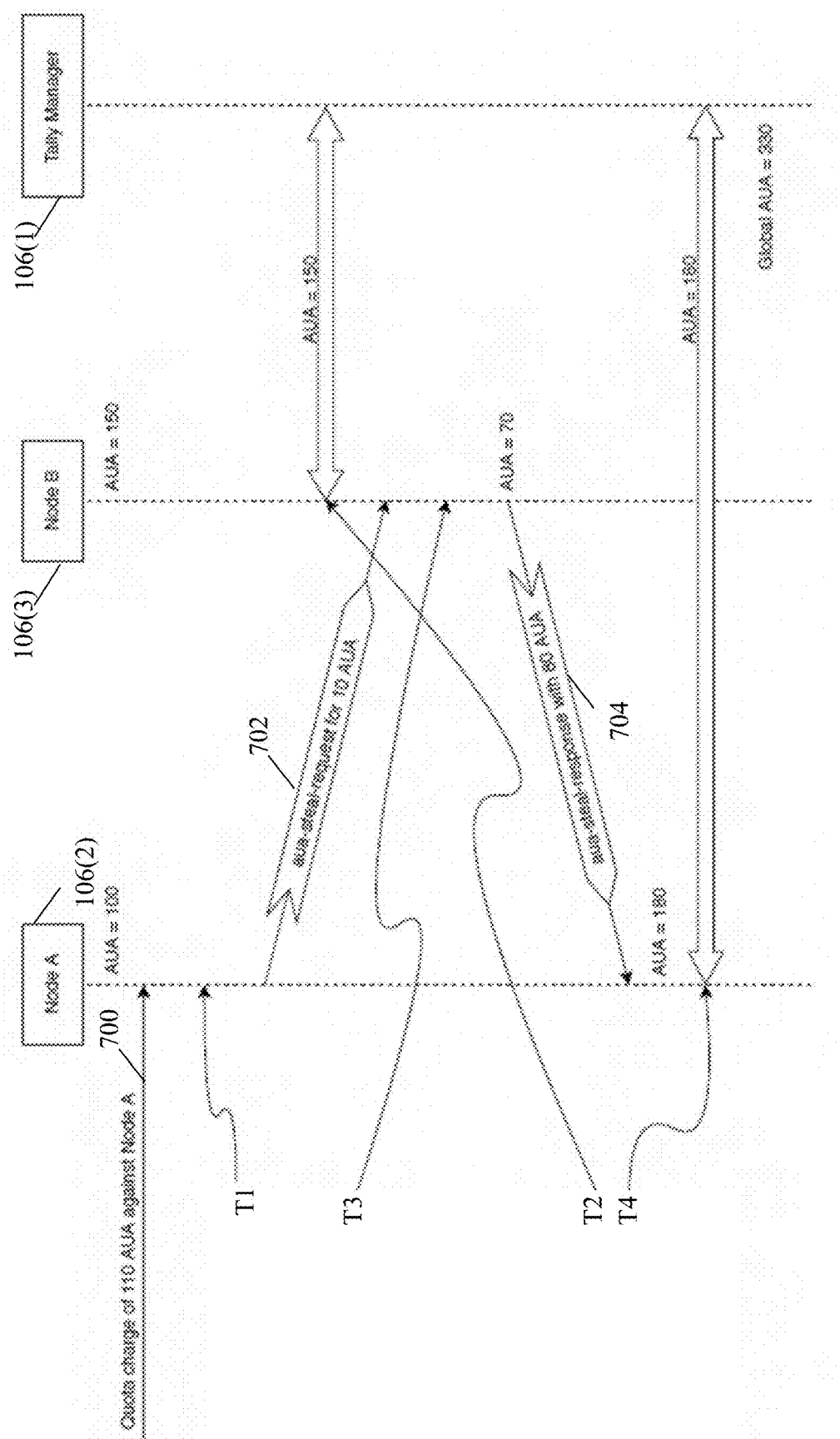
FIG. 7 is a timing diagram of an exemplary method for obtaining quota from a peer that results in a race condition with respect to a tally and an over-count of global allowed usage amount.

Referring more specifically to FIG. 7, a timing diagram of an exemplary method for obtaining quota from a peer that results in a race condition with respect to a tally and an over-count of global allowed usage amount is illustrated. In this example, steps 700, 702, and 704 occur as described and illustrated earlier with reference to steps 600, 602, and 604 of FIG. 6, respectively. Additionally, the status of the node computing devices 106(2) and 106(3) at times T1 and T3 is the same as described and illustrated earlier with reference to times T1 and T2, respectively, of FIG. 6.

However, at time T2, the tally management module 222 of the node computing device 106(1) initiates a tally operation, as described and illustrated earlier with reference to step 304 of FIG. 3 and FIGS. 4-5. In this example, the node computing device 106(3) responds to a request to read its local AUA from the node computing device 106(1) as part of the tally operation before it receives the steal request from the node computing device 106(2).

At time T4, after the node computing device 106(2) has received the response to the steal request from the node computing device 106(3), the node computing device 106(2) responds to a request to read its local AUA from the node computing device 106(1) as part of the tally operation. In this example, the node computing device 106(1) will double count the stolen AUA as part of the global AUA determination, which may result in erroneously allowing quota consuming operations to occur.

Figure 8:
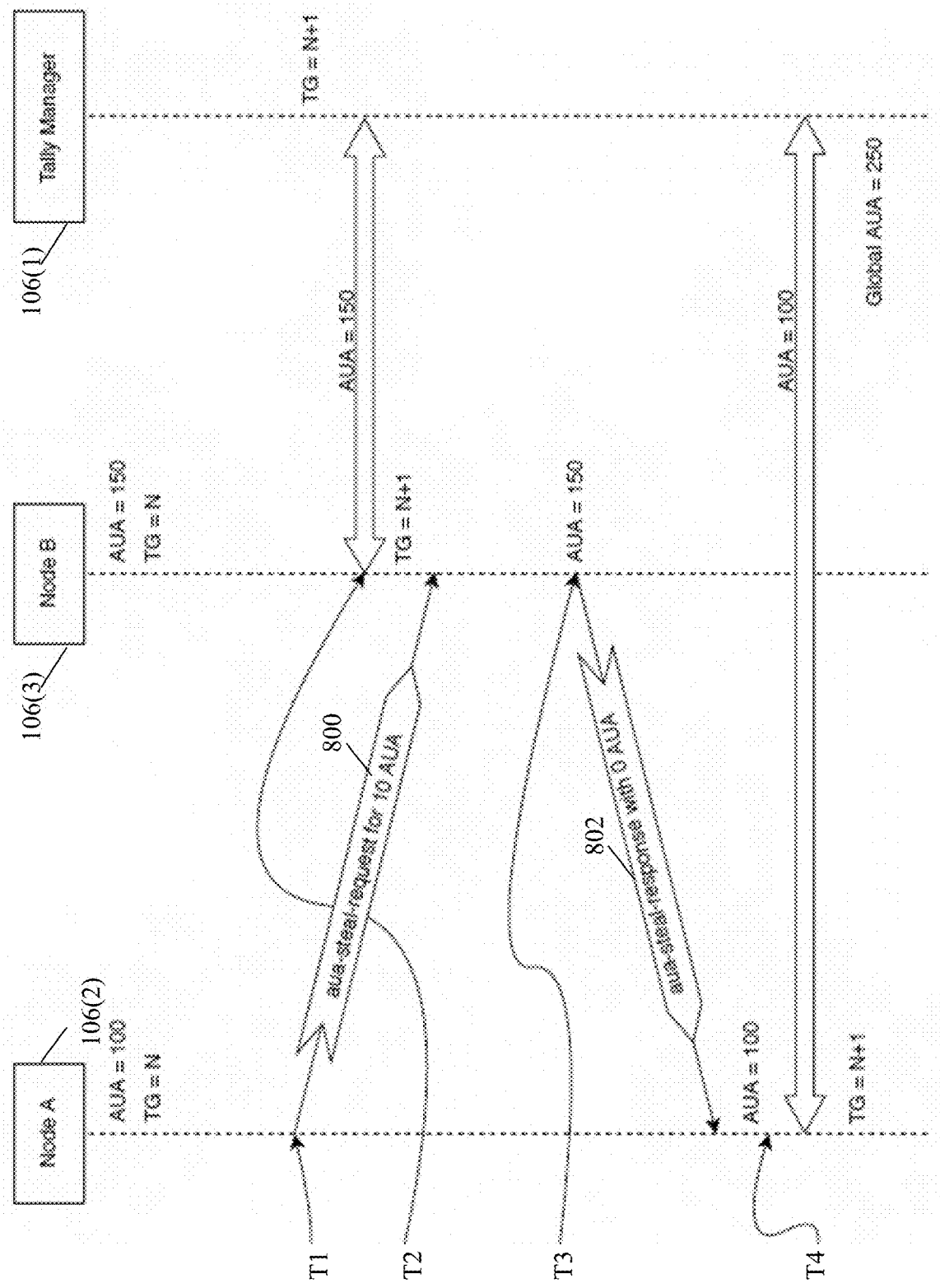
FIG. 8 is a timing diagram of an exemplary method for obtaining quota from a peer using a tally generation number that solves the over-count problem illustrated in FIG. 7.

Referring more specifically to FIG. 8, a timing diagram of an exemplary method for obtaining quota from a peer using a tally generation number that solves the over-count problem illustrated in FIG. 7 is illustrated. In this example, the node computing device 106(2) sends a steal request for 10 AUA to node computing device 106(3) in step 800, as described and illustrated earlier with reference to step 702 of FIG. 7. However, in this example, the node computing device 106(2) at time T1 sends a stored tally generation number (referred to in FIG. 8 as TGN) along with the steal request. The stored TGN could have been stamped on a quota ticket received from the node computing device 106(1) as described and illustrated earlier with reference to steps 400 and 406 of FIG. 4, for example.

At time T2, when the node computing device 106(1) initiates a tally operation, the node computing device 106(3) receives an incremented TGN along with the request to read its local AUA, and replaces the stored TGN accordingly. At time T3 in this example, the node computing device 106(3) compares the incremented TGN with the TGN received from node computing device 106(2) along with the steal request, and determines that there is not a match. Since the TGNs do not match, the node computing device 106(3), in step 802, sends 0 AUA in response to the steal request.

At time T4, the node computing device 106(2), having received 0 AUA from node computing device 106(3), continues to try to obtain AUA from one or more other peer(s) in the cluster (e.g., node computing device 106(1)). Accordingly, the response to a request from the node computing device 106(1) for its local AUA at time T4 will not double count any stolen AUA, and the global AUA determination by the node computing device 106(1) will be accurate. Additionally, the node computing device 106(2) updates its stored TGN based on the incremented TGN included in the request from the node computing device 106(1) for its local AUA. Using the TGNs advantageously allows for an accurate global AUA determination despite the race condition that can be introduced due to a steal operation occurring in parallel with a tally operation.

Figure 9:
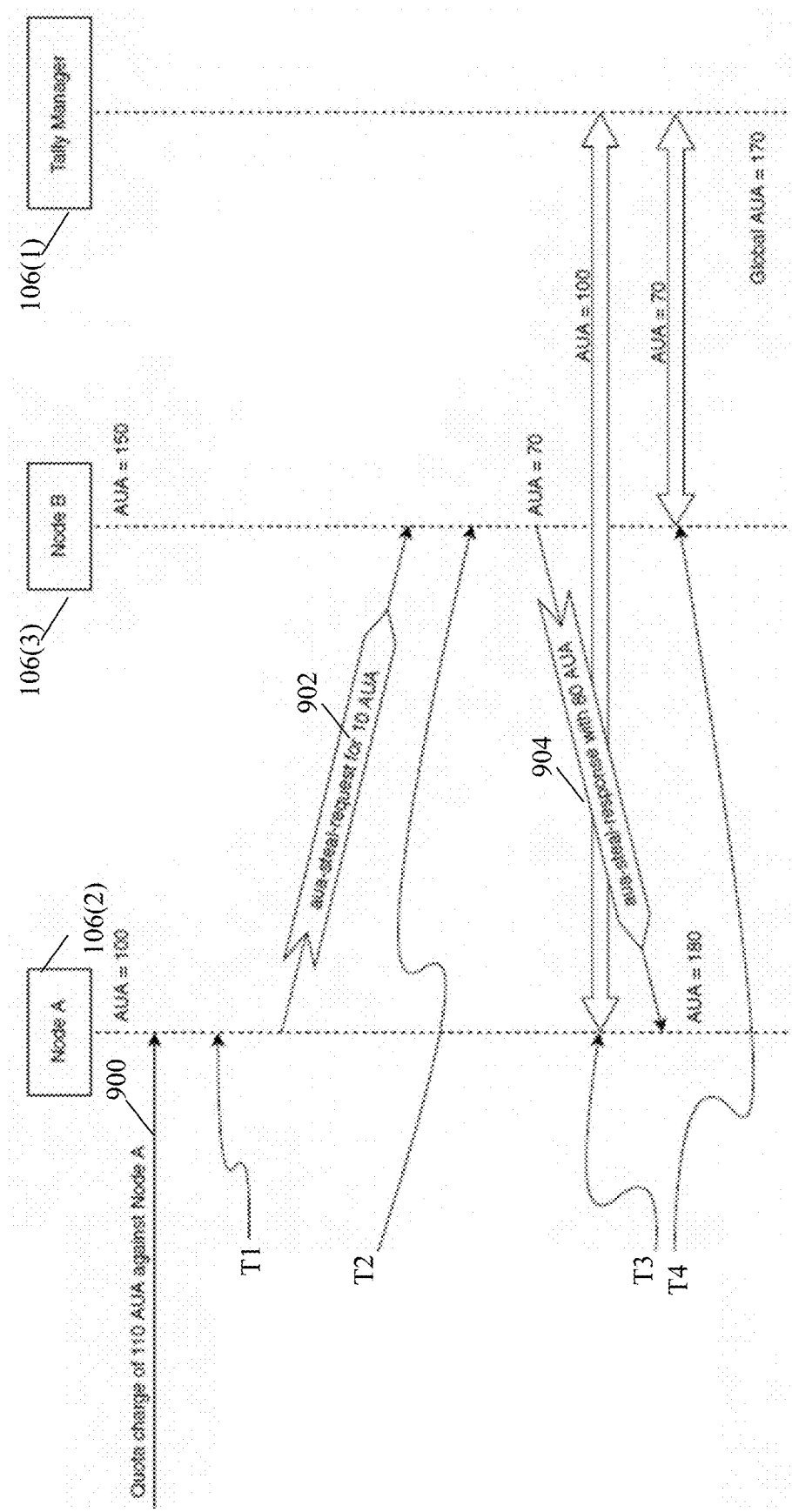
FIG. 9 is a timing diagram of an exemplary method for obtaining quota from a peer that results in a race condition with respect to a tally and an under-count of global allowed usage amount.

Referring more specifically to FIG. 9, a timing diagram of an exemplary method for obtaining quota from a peer that results in a race condition with respect to a tally and an under-count of global allowed usage amount is illustrated. In this example, steps 900, 902, and 904 occur as described and illustrated earlier with reference to steps 600, 602, and 604 of FIG. 6, respectively. Additionally, the status of the node computing devices 106(2) and 106(3) at times T1 and T2 is the same as described and illustrated earlier with reference to times T1 and T2, respectively, of FIG. 6.

However, at time T3 in this example, the node computing device 106(1) initiates a tally operation. Since the node computing device 106(3) receives a request to read its local AUA from the node computing device 106(1) as part of the tally operation after responding to the steal request from the node computing device 106(2), it responds with the resulting local AUA of 70 at time T4. In this example, the node computing device 106(2) responds to a request from the node computing device 106(1) to read its local AUA before it receives the steal response from the node computing device 106(3). Accordingly, the node computing device 106(1) determines the global AUA as 170, which fails to account for the stolen AUA.

Figure 10:
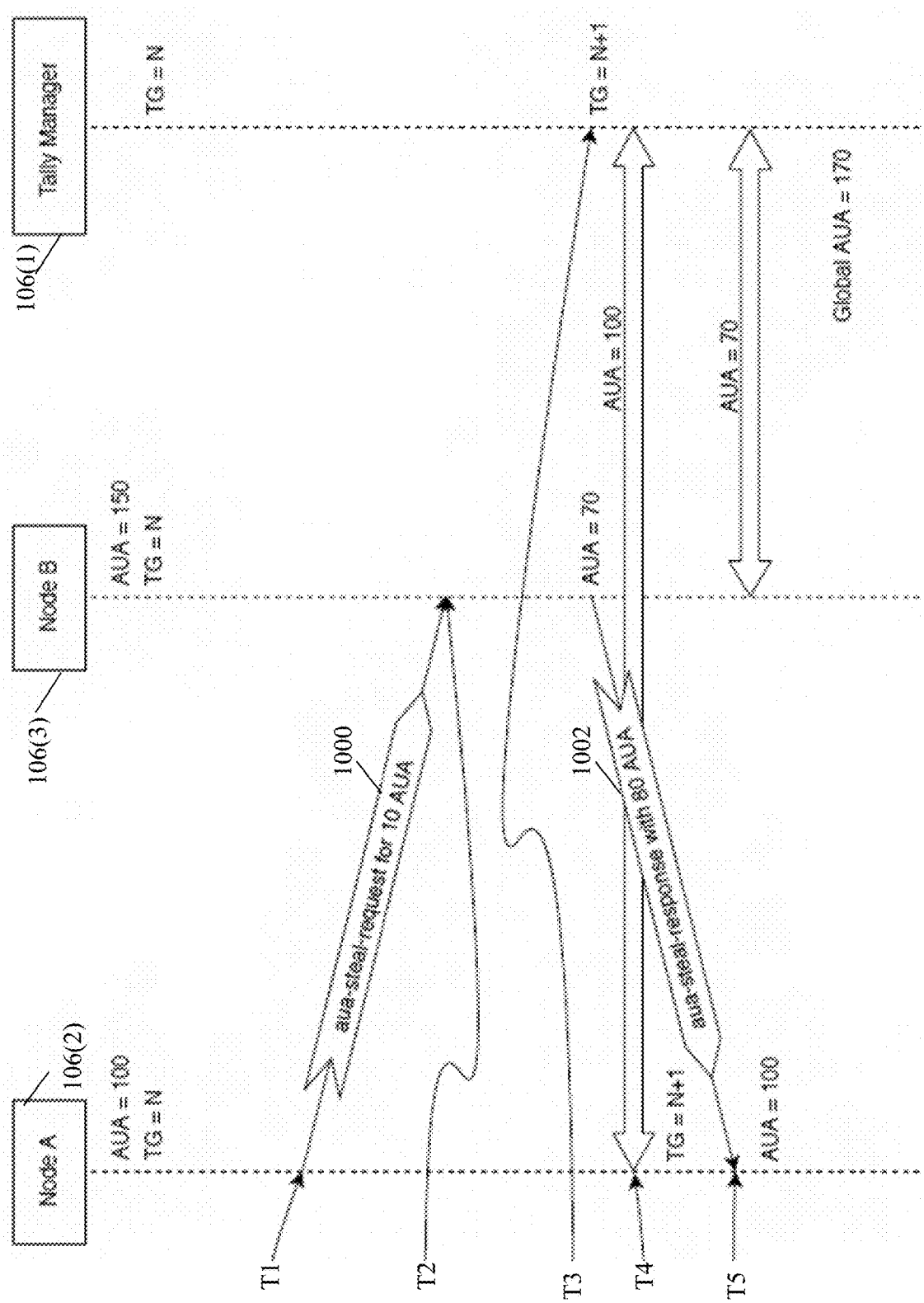
FIG. 10 is a timing diagram of an exemplary method for obtaining quota from a peer using a tally generation number that solves the under-count problem illustrated in FIG. 10.

Referring more specifically to FIG. 10, a timing diagram of an exemplary method for obtaining quota from a peer using a tally generation number that solves the under-count problem illustrated in FIG. 10 is illustrated. In this example, the node computing device 106(2) sends a steal request for 10 AUA to node computing device 106(3) in step 1000, as described and illustrated earlier with reference to step 902 of FIG. 9. However, in this example, the node computing device 106(2) at time T1 sends a stored TGN along with the steal request. The stored TGN could have been stamped on a quota ticket received from the node computing device 106(1) as described and illustrated earlier with reference to steps 400 and 406 of FIG. 4, for example.

At time T2, the node computing device 106(3) compares the TGN in the steal request with a stored TGN. Since the TGNs match, the node computing device 106(3) grants the steal request and sends a steal response that includes the TGN. When a tally operation is initiated by the node computing device 106(1) at time T3, it increments its stored TGN and sends the incremented TGN along with a read request for a local AUA to each of node computing device 106(2) and 106(3). The node computing devices 106(2 receives the request to read its local AUA at time T4 and replaces its stored TGN with the incremented TGN included therein.

At time T5, the node computing device 106(2) receives the steal response from the node computing device 106(3) and compares the TGN included in the response with the incremented TGN stored at time T4. Since the TGNs do not match in this example, the node computing device 106(2) ignores the steal response and does not increase its local AUA. In other words, the stolen AUA is effectively dropped and will be refilled according to the process described and illustrated in more detail earlier with reference to FIG. 5. The node computing device 106(2) will then continue to try to obtain AUA from one or more other peer(s) in the cluster (e.g., node computing device 106(1)). Accordingly, the response, subsequent to time T5, to a request from the node computing device 106(1) for its local AUA will not include any stolen AUA, and the global AUA determination by the node computing device 106(1) will be accurate.

Referring back to FIG. 3, in step 318, the node computing device 106(1) determines whether the local AUA is now sufficient to process the quota consuming operation received in step 300. In other words, the node computing device 106(1) determines whether the attempt to obtain the quota necessary to complete the quota consuming operations via steal operation(s) was successful. If the node computing device 106(1) determines that the local AUA is sufficient to process the quota consuming operation, then the No branch is taken to step 312, and the local AUA is updated as described and illustrated in more detail earlier.

However, if the node computing device 106(1) determines in step 318 that the local AUA is still insufficient to process the quota consuming operation, then the Yes branch is taken to step 304, and the node computing device 106(1) obtains quota information, such as by prompting the tally management module 222 to initiate a tally operation, as described and illustrated in more detail earlier. In other examples, one or more of steps 300-318 can occur in a different order or in parallel for any number of quota consuming operations that may be associated with different quota rules.

In other examples, this technology includes means, described and illustrated in more detail earlier with reference to FIGS. 1-2, including with respect to the quota management module 220 and tally management module 222, for obtaining a quota ticket comprising a TGN and a local AUA that comprises a portion of a global AUA associated with a quota rule. Means for increasing the local AUA following receipt of another portion of the global AUA in a response from a cluster peer, when another TGN in the response matches the TGN and the local AUA is insufficient to execute a received storage operation associated with the quota rule, are also provided. Additionally, this technology includes means for decreasing the local AUA by an amount corresponding to, and following execution of, the storage operation, when the increased local AUA is sufficient to execute the storage operation.

In these examples, the disclosed technology can also include means for determining a TTL for the quota ticket based on proximity of a global actual quota usage to the global AUA. Further, means for determining the global AUA based on an internal quota limit that is larger than an actual quota limit set for the quota rule, wherein a difference between the internal and actual quota limits is bounded, are also provided. Even further, this technology can include means for sending a steal request to another cluster peer without increasing the local AUA, when the TGN does not match the another TGN in the response. Additionally, means for denying a steal request received from another cluster peer, when an additional TGN in the steal request fails to match the TGN, are also provided.

This technology initiates tally operations more frequently as quota usage approaches a limit, allows steal operations between storage nodes that reduce the number of consecutive steal requests, and utilizes ticket generation numbers to manage race conditions and avoid inaccurate global usage determination, among other advantages that improve quota management and enforcement in storage networks. With this technology, communication overhead and associated resource utilization of storage nodes required to enforce quotas is reduced. With reduced resources required for quota enforcement, storage nodes can devote increased resources to file operations, thereby improving operation latency and throughput.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a cluster peer designated as a tally manager, the method comprising:
   obtaining a first local allowed usage amount (AUA) from each of a plurality of cluster peers and an actual quota usage against a quota rule from each of a plurality of storage volumes;
   distributing to each of the cluster peers a quota ticket comprising a first tally generation number (TGN) and a time-to-live (TTL),
   wherein the TTL is determined based on a first comparison of a first sum of the actual quota usages to an external quota limit;
   adjusting one or more of the first local AUAs and a second local AUA maintained locally by the cluster peer based on a second comparison of an internal quota limit to a second sum of the first local AUAs and the first sum, wherein the internal quota limit is higher than the external quota limit; and
   executing a received storage operation when the adjusted second local AUA is sufficient to execute the received storage operation.

2. The method of claim 1, further comprising decreasing the second local AUA by an amount corresponding to the storage operation following the execution of the received storage operation.

3. The method of claim 1, further comprising increasing each of the first local AUAs and the second local AUA proportionally such that the second sum equals the internal quota limit, when the second comparison indicates the second sum is less than the internal quota limit.

4. The method of claim 1, further comprising decreasing each of the first local AUAs and the second local AUA proportionally such that the second sum equals the internal quota limit, when the second comparison indicates the second sum is greater than the internal quota limit.

5. The method of claim 1, further comprising maintaining the one or more of the first local AUAs and the second local AUA, without adjusting the one or more of the first local AUAs and the second local AUA, when the second comparison indicates the second sum is equal to the internal quota limit.

6. The method of claim 1, further comprising determining the TTL based on a size of the gap between the first sum and the external quota limit such that a shorter TTL is generated for a smaller size of the gap and a longer TTL is generated for a larger size of the gap.

7. The method of claim 1, further comprising updating a second TGN maintained locally by the cluster peer after generating the quota ticket, wherein the second TGN is used to generate the first TGN and is monotonically increasing.

8. The method of claim 1, wherein each of the first local AUAs comprises a portion of a global AUA associated with the quota rule.

9. The method of claim 1, wherein the storage volumes are in a same volume group, the received storage operation is received from a client and comprises a write storage operation directed to one of the storage volumes, and the quota rule defines an amount of storage space within the volume group that is available to the client.

10. A non-transitory machine readable medium having stored thereon instructions for storage quota enforcement comprising machine executable code which when executed by a cluster peer designated as a tally manager causes the cluster peer to:
   distribute to each of a plurality of cluster peers a first quota ticket comprising a first time-to-live (TTL) and a first indication that storage operation execution is quiesced, when a first sum of first actual quota usages obtained from a plurality of storage volumes is greater than or equal to an external quota limit;

distribute to each of the cluster peers a second quota ticket comprising a second indication that storage operation execution is permitted, when a second sum of second actual quota usages obtained from the storage volumes after expiration of the first TTL is less than the external quota limit; and execute one or more received storage operations after distributing the second quota tickets.

11. The non-transitory machine readable medium of claim 10, wherein the first quota ticket further comprises a first tally generation number (TGN) and the second quota ticket further comprises a second TTL and a second TGN higher than the first TGN.

12. The non-transitory machine readable medium of claim 11, wherein the machine executable code when executed by the cluster peer further causes the cluster peer to obtain a first local allowed usage amount (AUA) from each of the cluster peers, wherein each of the first local AUAs comprises a portion of a global AUA.

13. The non-transitory machine readable medium of claim 12, wherein the machine executable code when executed by the cluster peer further causes the cluster peer to obtain a second local AUA from each of the cluster peers after expiration of the first TTL, wherein the second TTL is determined based on a difference between a first sum of the second actual quota usages and the external quota limit.

14. The non-transitory machine readable medium of claim 10, wherein the storage volumes are in a same volume group, the received storage operations are received from a client and comprise write storage operations directed to one of the storage volumes, and the quota rule defines an amount of storage space within the volume group that is available to the client.

15. A cluster peer, comprising:

a memory containing machine readable medium comprising machine executable code having stored thereon instructions for storage quota enforcement; and a processor coupled to the memory, the processor configured to execute the machine executable code to cause the processor to:

distribute to each of the cluster peers, and store in the memory, a quota ticket comprising a time-to-live (TTL) determined based on an external quota limit and actual quota usages against an amount of storage space within a volume group that is available to a client, wherein the actual quota usages are obtained from each of a plurality of storage volumes in a volume group;

adjust one or more a plurality of first local allowed usage amounts (AUAs) obtained from a plurality of cluster peers and a second local AUA maintained locally by the cluster peer based on an internal quota limit, the first local AUAs, the actual quota usages, and the external quota limit, wherein the internal quota limit is higher than the external quota limit; and execute a storage operation received from the client and directed to one of the storage volumes, when the adjusted second local AUA is sufficient to execute the received storage operation and the quota ticket is determined to be unexpired based on the TTL.

16. The cluster peer of claim 15, wherein the processor is further configured to execute the machine executable code to decrease the second local AUA by an amount corresponding to the storage operation following the execution of the storage operation.

17. The cluster peer of claim 15, wherein the processor is further configured to execute the machine executable code to determine the TTL based on a size of the gap between the first sum and the external quota limit such that a shorter TTL is generated for a smaller size of the gap and a longer TTL is generated for a larger size of the gap.

18. The cluster peer of claim 15, wherein the processor is further configured to execute the machine executable code to update a second tally generation number (TGN) maintained locally by the cluster peer after generating the quota ticket, wherein the second TGN is used to generate a first TGN of the quota ticket and is monotonically increasing.

19. The cluster peer of claim 15, wherein each of the first local AUAs comprises a portion of a global AUA associated with the quota rule.

20. A tally manager storage node in a cluster of peer storage nodes, the tally manager storage node comprising:

a processor coupled to a memory and configured to execute machine executable code stored in the memory to cause the tally manager storage node to:

determine a local amount of storage space available to be consumed by a client with respect to a volume group within a time period, wherein a defined storage rule limits the client to a global amount of storage space within the volume group;

distribute to each of the other storage nodes in the cluster of storage nodes, and store in the memory, the local amount of storage, wherein the local amounts of storage space collectively exceed the global amount of storage space by a bounded amount to facilitate reduced cluster communications required to manage enforcement of the storage rule;

determine that the stored local amount of storage space is sufficient to process a storage operation received from the client and directed to a storage volume in the volume group, when the global amount of storage space has not been exceeded and the time period is unexpired; and reduce the stored local amount of storage space by an amount associated with the storage operation following execution of the storage operation.

* * * * *